United States Patent [19]

Haug et al.

[11] 4,089,845

[45] May 16, 1978

[54] THERMOSETTING MIXTURES WHICH ARE STABLE ON STORAGE FROM POLYIMIDE AND β-AMINO-CROTONIC ACID

[75] Inventors: Theobald Haug, Frenkendorf; Jurg Kiefer, Reinach; Peter Ruf, Binningen, all of Switzerland; Andre Schmitter, Hegenheim, France

[73] Assignee: Ciba-Geigy Corporation, Ardsely, N.Y.

[21] Appl. No.: 588,529

[22] Filed: Jun. 19, 1975

[30] Foreign Application Priority Data

Jul. 2, 1974 Switzerland .......................... 9050/74

[51] Int. Cl.² ............................................ C08G 69/08
[52] U.S. Cl. ................................ 260/78 A; 260/37 N; 260/47 CZ; 260/47 CP; 260/78 UA; 428/474

[58] Field of Search .......... 260/78 A, 78 UA, 47 CZ, 260/47 UA

[56] References Cited

FOREIGN PATENT DOCUMENTS 2,350,496 4/1974 Germany.

Primary Examiner—Harold D. Anderson
Attorney, Agent, or Firm—Luther A. R. Hall

[57] ABSTRACT

Mixtures which can be cured to give moulded materials having technically valuable mechanical and dielectric properties, characterized that they contain
(a) polyimides of maleic acid or citraconic acid,
(b) derivatives of β-amino-crotonic acid, and optionally
(c) polyamines.

10 Claims, No Drawings

THERMOSETTING MIXTURES WHICH ARE STABLE ON STORAGE FROM POLYIMIDE AND β-AMINO-CROTONIC ACID

The present invention relates to new, thermosetting mixtures which are stable on storage and are based on polyimides of certain unsaturated dicarboxylic acids and β-aminocrotonic acid esters and/or amides, and to a process for the manufacture of moulded materials from these thermosetting mixtures.

It is known from French Patent Specification 1,555,564 that bis-maleimides can be converted, together with diprimary diamines, into infusible, insoluble moulded materials, it being necessary that the diamines used contain no further functional groups which can enter into side-reactions. However, the products obtained from these mixtures suffer from the disadvantage that they do not have a particularly high resistance to heat distortion and, in addition, long curing times are required for their manufacture.

The polyaddition reaction disclosed in French Pat. No. 1,555,564 is explained in greater detail in the "Journal of Polymer Science" (Polymer Chemistry Edition) volume 11, page 1,185 (1973). According to the results of the investigation, it is based on the addition of a NH₂ group of amine character to the C=C double bond of the maleimide, with the formation of a cyclic aspartic imide group.

It has now been found that polyimides of certain unsaturated dicarboxylic acids, such as, for example, bis-maleimide, and compounds which contain a N-substituted or N-unsubstituted β-aminocrotonyl radical, react rapidly with one another and can be cured to give moulded materials which have valuable mechanical properties.

The β-aminocrotonic acid esters and/or amides to be used in accordance with the invention, are not amines in the strict sense. Although they possess NH₂ or NHR groups (R = substituent, for example alkyl), these form a conjugated system together with the C=C double bond and the ester or amide group, and thereby acquire a reactive character like the NH₂ or NHR groups in ureas or urethanes. The β-aminocrotonic acid esters or amides to be used in accordance with the invention are, accordingly, to be regarded as vinylogous ureas or urethanes and not as amines in the classical sense.

Model experiments have also shown that, in the present case, the polyaddition reaction is not based on the previously known addition of a NH₂ or NHR group to the C=C double bond of polyimides of certain unsaturated dicarboxylic acids, but is based on the formation of pyrrolinone derivatives as shown in the following equation:

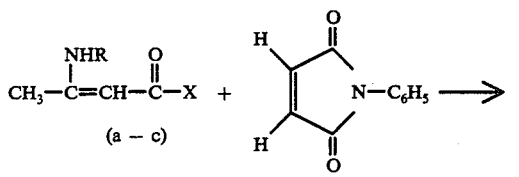

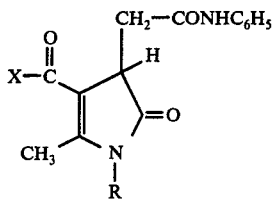

a: R = H, X = —OCH₃
b: R = CH₃, X = —OCH₃
c: R = H,

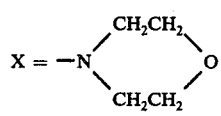

The high rate at which the new polyaddition reaction proceeds is advantageous for many industrial applications. By virtue of the rapidity of the reaction, the operating cycle of moulds, for example in the conversion of compression moulding compositions into mouldings or the manufacture of foam mouldings, is very short. Thus the products manufactured in accordance with French Pat. No. 1,555,564 require curing at 200°-230° C for 15 - 20 hours. These long curing times can only be shortened, if at all, by the application of pressure. On the other hand, the new, thermosetting mixtures require a moulding time of only a few minutes.

It has, surprisingly, also been found that the short moulding times are still retained if the thermosetting mixtures, consisting of polyimides and β-aminocrotonyl derivatives, are modified with polyamines, so that the thermosetting mixtures can, if desired, contain polyamines as modifying agents.

Although the mixtures described in DT-OS 2,350,496, which consist of polyimides of unsaturated dicarboxylic acids, polyamines and azomethines, also require shorter moulding times than the mixtures disclosed in French Pat. No. 1,555,564, they cause difficulties in certain applications, for example as compression moulding compositions, so that they can only be used advantageously in the form of pre-polymers.

The present invention therefore relates to new thermosetting mixtures which are stable on storage and which are characterised in that they contain a. polyimides of certain unsaturated dicarboxylic acids of the general formula I

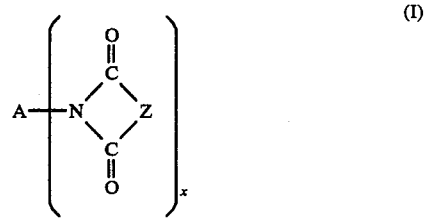

in which A denotes an x-valent, organic radical having at least 2 and not more than 30 carbon atoms, Z represents a radical of the formulae

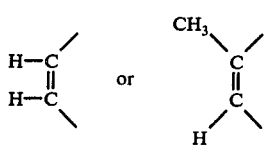

and x denotes the number 2 or 3, b. β-aminocrotonic acid derivatives of the formulae II - VIII

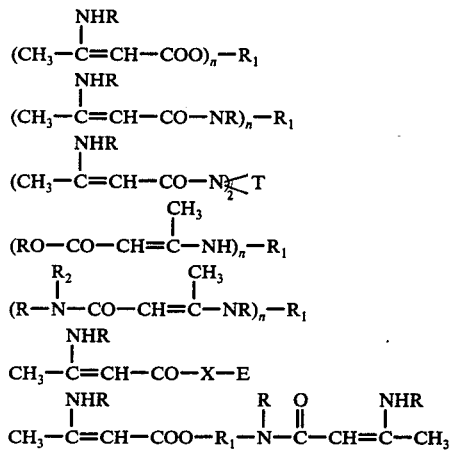

wherein R and R$_2$ independently of one another each represent a hydrogen atom or a linear, branched or cyclic hydrocarbon radical having 1 – 9 carbon atoms, R$_1$ denotes a n-valent, linear, branched or cyclic hydrocarbon radical having 2 – 20 carbon atoms or a heterocyclic ring containing N, O or S atoms, T, conjointly with the two nitrogen atoms, denotes a heterocyclic, five-membered or six-membered ring having 3 – 8 carbon atoms, X represents an oxygen atom or the —NH— group, E represents a linear, branched, cyclic or heterocyclic radical which has 3 – 6 carbon atoms and has a grouping suitable for polymer reactions, and n represents an integer from 2 to 4, and optionally c. polyamines of the formula IX or X

(IX)

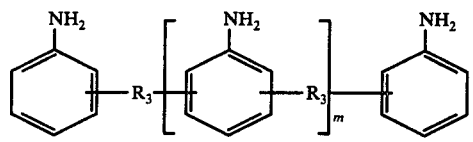

(X)

wherein, in the formula IX, the radical G denotes a y-valent organic radical having 2 to 40 carbon atoms and y represents an integer from 2 to 4, and wherein, in the formula X, the radicals R$_3$ each denote a divalent hydrocarbon radical obtained by removing the oxygen atom of an aldehyde or ketone having 1 to 8 carbon atoms, and m represents a number from 0.1 to 2.

The mixtures according to the invention preferably contain:

a. Polyimides of the formula I in which A denotes a radical of the formulae

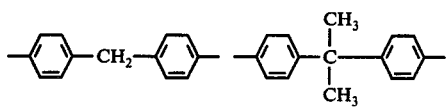

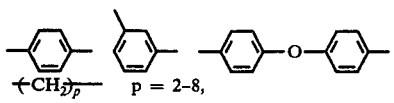

$+CH_2+_p$   p = 2–8,

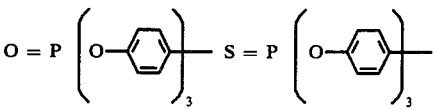

and Z denotes the vinylene radical, b. β-aminocrotonic acid esters of the formula II wherein n denotes the number 2, R denotes a hydrogen atom and R$_1$ denotes an alkylene radical which has 2 – 10 carbon atoms and which is optionally interrupted by ether oxygen atoms, or denotes a radical of the formulae

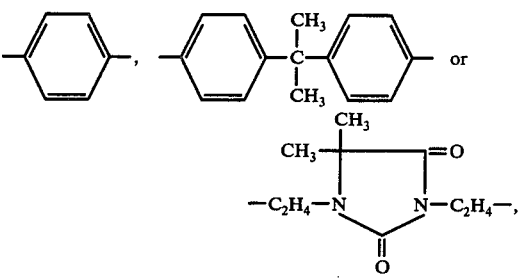

β-aminocrotonic acid amides of the formula III in which n denotes the number 2, R denotes a hydrogen atom and R$_1$ denotes an alkylene radical which has 2 – 10 carbon atoms and which is optionally interrupted by ether oxygen atoms, or denotes a radical of the formulae

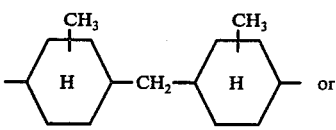

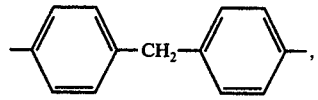

β-aminocrotonic acid amides of the formula IV in which R denotes a hydrogen atom, and the grouping

represents the radical of the formula

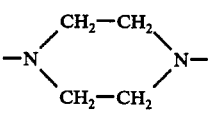

β-aminocrotonic acid esters of the formula V in which n denotes the number 2 and R denotes the methyl or phenyl group, and $R_1$ has the same meaning as above in the β-aminocrotonic acid amides of the formula III, β-aminocrotonic acid amides of the formula VI in which n denotes the number 2, R denotes a hydrogen atom, $R_2$ denotes the phenyl group or a lower alkyl group having 1 – 4 carbon atoms and $R_1$ has the same meaning as above in the β-aminocrotonic acid amides of the formula III, β-aminocrotonic acid esters of the formula VII wherein R denotes a hydrogen atom and E denotes the allyl radical or one of the radicals of the formula

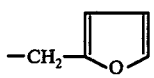

and β-aminocrotonic acid ester amides of the formula VIII in which R denotes a hydrogen atom and $R_1$ denotes a phenyl radical or an alkylene radical having 2 – 10 carbon atoms, and optionally c. di- or tri-primary polyamines of the formula IX wherein G denotes an organic radical having 2 to 40 carbon atoms.

In a particular embodiment, the mixtures according to the invention consist of (a) polyimides of the formula I and (b) β-aminocrotonic acid derivatives of the formulae II to V.

The polyimides of the formula I represent a known class of compounds and can be manufactured by using the methods described in U.S. Patent Specification 3,018,290 and in British Patent Specification 1,137,592, by reacting the corresponding diamines with the unsaturated dicarboxylic acid anhydrides in a polar solvent and in the presence of a catalyst.

The symbol A in the formula I can denote a linear or branched alkylene radical having less than 20 carbon atoms, a phenylene radical, a cyclohexylene radical or a radical of the formula

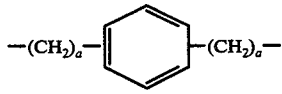

in which a represents an integer from 1 to 3.

The symbol A can also encompass several phenylene or cyclohexylene radicals which are linked direct via a single valency bond or via an atom or an inert group, such as, for example, oxygen or sulphur atoms or alkylene groups having 1 to 3 carbon atoms, or via the following groups: —CO—, —$SO_2$—, —NR— (R=Alkyl), —N=N—, —CONH—, —COO—, —CONH—A—NHCO—, O=P(O—)$_3$ or S=P(O—)$_3$.

In addition, the various phenylene or cyclohexylene radicals can be substituted by methyl groups.

The following may be mentioned as specific examples of polyimides of the formula I: N,N'-ethylene-bis-maleimide, N,N'-hexamethylene-bis-maleimide, N,N'-m-phenylene-bis-maleimide, N,N'-p-phenylene-bis-maleimide, N,N'-4,4'-diphenylmethane-bis-maleimide, N,N'-4,4'-3,3'-dichloro-diphenylmethane-bis-maleimide, N,N'-4,4'-diphenyl ether-bis-maleimide, N,N'-4,4'-diphenyl sulphone-bis-maleimide, N,N'-4,4'-dicyclohexylmethane-bis-maleimide, N,N'-α,α'-4,4'-dimethylenecyclohexane-bis-maleimide, N,N'-m-xylylene-bis-maleimide, N,N'-p-xylylene-bis-maleimide, N,N'-4,4'-diphenylcyclohexane-bis-maleimide, N'N'-m-phenylene-bis-citraconimide, N,N'-4,4'-diphenylmethane-bis-citraconimide, N,N'-4,4'-2,2-diphenylpropane-bis-maleimide, the N,N',N"-trismaleimide of tris-(4-aminophenyl) phosphate and the N,N',N"-trismaleimide of tris-(4-aminophenyl) thiophosphate.

Mixtures of two or more of these polyimides can also be used.

The β-aminocrotonic acid derivatives of the formulae II to VIII also belong to a known class of compounds and can be manufactured in accordance with the processes described in "Liebigs Annalen", volume 213, page 171 or in "Berichte der Deutschen Chemischen Gesellschaft", volume 20, page 274 (1887), by reacting the corresponding β-ketocarboxylic acid esters or amides with ammonia, monoamines or diamines.

The following may be mentioned as examples of the formula II: 1,2-ethylene glycol bis-(β-aminocrotonic acid ester), 1,4-butylene glycol bis-(β-aminocrotonic acid ester), 1,6-hexamethylene glycol bis-(β-aminocrotonic acid ester), α,ω-diethylene glycol bis-(β-aminocrotonic acid ester), α,ω-triethylene glycol bis-(β-aminocrotonic acid ester), 1,4-cyclohexanediol bis-(β-aminocrotonic acid ester), hydroquinone bis-(β-aminocrotonic acid ester), 2,2-bis-(4-hydroxyphenyl)propane bis-(β-aminocrotonic acid ester), α,α'-dihydroxy-p-xylylene bis-(β-aminocrotonic acid ester), bis-(β-hydroxyethyl)-5,5-dimethylhydantoin bis-(β-aminocrotonic acid ester), 1,2-ethylene glycol bis-(β-methylaminocrotonic acid ester), 1,4-butylene glycol bis-(β-butylaminocrotonic acid ester), 2,2-bis-(4-hydroxyphenyl)propane bis-(β-anilinocrotonic acid ester), trimethylolpropane tris-(β-aminocrotonic acid ester) and pentaerythritol tetra-(β-aminocrotonic acid ester).

The following may be mentioned as examples of the formula III: N,N'-bis-(β-aminocrotonyl)-ethylenediamine, N,N'-bis-(β-aminocrotonyl)-hexamethylenediamine, N,N'-bis-(β-aminocrotonyl-2,4,4-trimethylhexamethylenediamine, N,N'-bis-(β-aminocrotonyl)-dodecamethylenediamine, N,N'-bis-(β-aminocrotonyl)-m-phenylenediamine, N,N'-bis-(β-aminocrotonyl)-4,4'-diaminodiphenylmethane, N,N'-bis-(β-aminocrotonyl-3,3'-dichlor-4,4'-diaminodiphenylmethane, N,N'-bis-(β-aminocrotonyl)-4,4'-diamino-3,3'-dimethyldicyclohexylmethane, N,N'-bis-(β-aminocrotonyl)-1,4-diaminocyclohexane, N,N'-bis-(β-aminocrotonyl)-p-xylylenediamine, N,N'-bis-(β-aminocrotonyl)-1,3-di-(γ-aminopropyl)-5,5-dimethylhydantoin, N,N'-bis-(β-methylaminocrotonyl)-ethylenediamine, N,N'-bis-(β-anilinocrotonyl)-hexamethylenediamine, N,N'-bis-(β-butylaminocrotonyl)-4,4'-diaminodiphenylmethane, N,N'-bis-(β-butylaminocrotonyl)-4,4'-diamino-dicyclohexylmethane and N,N'-bis-(β-cyclohexylaminocrotonyl)-1,4-diaminocyclohexane.

The following may be mentioned as examples of the formula IV: N,N'-bis-(β-aminocrotonyl)-piperazine, N,N'-bis-(β-aminocrotonyl)-tetrahydropyrimidine and N,N'-bis-(β-aminocrotonyl)-imidazolidine.

The following may be mentioned as examples of the formula V: N,N'-ethylene-bis-(β-aminocrotonic acid methyl ester), N,N'-butylene-bis-(β-aminocrotonic acid ethyl ester), N,N'-(2,4,4-trimethyl)-hexamethylene-bis-(β-aminocrotonic acid methyl ester), N,N'-hexamethylene-bis-(β-aminocrotonic acid methyl ester), N,N'-p-phenylene-bis-(β-aminocrotonic acid methyl ester), N,N'-4,4'-diphenylenemethane-bis-(β-aminocrotonic acid methyl ester), N,N'-m-xylylene-bis-(β-aminocrotonic acid phenyl ester), N,N'-(di-γ-propylene)-5,5-dimethylhydantoin-bis-(β-aminocrotonic acid methyl ester and N,N'-4,4'-dicyclohexylmethane-bis-(β-aminocrotonic acid ethyl ester).

The following may be mentioned as examples of the formula VI: N,N'-ethylene-bis-(β-aminocrotonic acid methylamide), N,N'-hexamethylene-bis-(β-aminocrotonic acid n-butylamide), N,N'-(2,4,4-trimethyl)-hexamethylene-bis-(β-aminocrotonic acid n-butylamide), N,N'-butylene-bis-(β-aminocrotonic acid diethylamide), N,N'-p-phenylene-bis-(β-aminocrotonic acid anilide), N,N'-4,4'-diphenylmethane-bis-(β-aminocrotonic acid methylanilide), N,N'-4,4'-3,3'-dimethyldicyclohexylmethane-bis-(β-aminocrotonic acid cyclohexylamide) and N,N'-(di-γ-propylene)-5,5-dimethylhydantoin-bis-(β-aminocrotonic acid morpholide).

The following may be mentioned as examples of the formula VII: β-aminocrotonic acid allyl ester, β-tetrahydrofurfurylaminocrotonic acid tetrahydrofurfuryl ester, β-aminocrotonic acid tetrahydrofurfuryl ester and β-aminocrotonic acid allylamide.

The following may be mentioned as examples of the formula VIII: N-(β-aminocrotonyl)-ethanolamine-(β-aminocrotonic acid ester, 1-N-(β-aminocrotonyl)-propanolamine-3-(β-aminocrotonic acid ester) and N-(β-aminocrotonyl)-p-aminophenol-(β-aminocrotonic acid ester).

It is also possible to react mixtures of 2 or more crotonic acid derivatives of the formula II - VIII with the polyimides of the formula I.

The polyamines of the formulae IX and X are known compounds.

If the polyamine of the formula IX is a diprimary polyamine, G in formula IX has the same meaning as A in formula I and x denotes 2.

The following may be mentioned as examples of diamines of the formula IX: 4,4'-diamino-dicyclohexylmethane, 1,4-diamino-cyclohexane, m-phenylenediamine, p-phenylenediamine, 4,4'-diamino-diphenylmethane, bis-(4-aminophenyl)-2,2-propane, 4,4'-diamino-diphenyl ether, 4,4'-diaminodiphenylsulphone, 1,5-diaminonaphthalene, m-xylylenediamine, p-xylylenediamine, ethylenediamine, hexamethylenediamine, bis-(γ-aminopropyl)-5,5-dimethyl-hydantoin and 4,4'-diaminotriphenyl phosphate.

The use of m-phenylenediamine, 4,4'-diaminodiphenylmethane, 4,4'-diamino-diphenyl ether, hexamethylenediamine, 4,4'-diamino-triphenyl phosphate or 4,4'-diamino-triphenyl thiophosphate is preferred.

Among the polyamines of the formula IX which are different from the diprimary polyamines of the formula IX, use is preferably made of those which have less than 40 carbon atoms and contain 3 or 4 NH₂ groups per molecule. The NH₂ groups can be substituents on a benzene ring which is optionally substituted by methyl groups, or a naphthalene ring, on a pyridine ring or on a triazine ring. They can also be substituents on several benzene rings which are linked to one another via a single valency bond, an atom or an inert group which have already been mentioned under the diprimary polyamines of the formula IX, or by one of the following groups

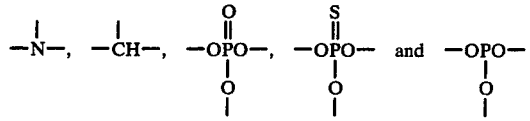

The following can be mentioned as examples of such polyamines: 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminodiphenyl, 3,4,6-triaminopyridine, 2,4,4'-triaminophenyl ether, 2,4,4'-triaminodiphenylmethane, 2,4,4'-triaminodiphenyl-sulphone, 2,4,4'-triaminobenzophenone, 2,4,4'-triamino-3-methyl-diphenylmethane, N,N,N-tri(4-aminophenyl)-amine, tri-(4-aminophenyl)-methane, tri-(4-aminophenyl) phosphate, tri-(4-aminophenyl) phosphite, tri-(4-aminophenyl) thiophosphate, 3,5,4'-triaminobenzanilide, melamine, 3,5,3',5'-tetraaminobenzophenone, 1,2,4,5-tetraaminobenzene, 2,3,6,7-tetraaminonaphthalene, 3,3'-diaminobenzidine, 3,3',4,4'-tetraaminophenyl ether, 3,3',4,4'-tetraaminodiphenylmethane, 3,3',4,4'-tetraaminodiphenyl-sulphone and 3,3-bis-(3,4'-diaminophenyl)-pyridine.

The use of tri(4-aminophenyl) phosphate, tri-(aminophenyl) phosphite and tri-(4-aminophenyl) thiophosphate, or a mixture of these, is preferred.

The polyamines of the formula X are also known compounds and can be obtained in accordance with the processes described in French Patent Specifications 1,430,977 and 1,481,935 by reacting primary aromatic amines with aldehydes or ketones.

Examples of aldehydes or ketones used here are formaldehyde, acetaldehyde, benzaldehyde, oenanthaldehyde, acetone, methyl ethyl ketone, cyclohexanone and acetophenone.

Mixtures of 2 or more polyamines of the formulae IX and X can also be reacted with the polyimides of the formula I and the crotonic acid derivatives of the formulae II - VIII.

The polyimide of the formula I can be converted, together with the β-aminocrotonic acid derivatives of the formulae II - VIII, on their own into a macromolecular material. If the reaction is carried out, if appropriate, in the presence of a polyamine of the formulae IX - X, the mixture of β-aminocrotonic acid derivative and polyamine contains not more than 90%, preferably 1 - 50%, and particularly 20 - 50%, of equivalents of amino groups, relative to the sum of the equivalents of β-aminocrotonyl groups and primary amino groups.

The mixing ratio between the polyimides of the formula I, the β-aminocrotonic acid derivatives of the formulae II - VIII and the polyamines of the formulae IX - X which are optionally present, can vary within a wide range. It is selected in such a way that the number of equivalents of β-aminocrotonyl groups, or the sum of the equivalents of β-aminocrotonyl groups and primary amino groups, is, at most, equal to the number of equivalents of imide groups. Preferably, there is present in the thermosetting mixture an equivalent excess of imide groups, relative to the equivalents of β-aminocrotonyl groups or to the sum of the equivalents of β-aminocrotonyl groups and equivalents of primary amino groups. Up to a 4-fold excess of imide group equivalents can be present in the thermosetting mixture. The compositions of this invention contain 0.25 to 1.0 equivalent of β-aminocrotonyl groups (b) per each 1 equivalent of imide groups (a) and preferably between 0.25 and something less than 1.0 equivalent of β-aminocrotonyl groups per each 1.0 equivalent of imide groups.

The curing of the mixtures according to the invention is carried out by warming the mixtures to temperatures between 50° and 280° C, preferably 150° – 250° C, whereupon the mixtures pass over into crosslinked, insoluble and infusible products without the evolution of volatile reaction products.

For some industrial applications the addition of a curing catalyst is advantageous. The cured condition is achieved more rapidly by adding, for example, a small quantity of an organic peroxide or persalt. Compounds such as di-tert.-butyl peroxide, dilauryl peroxide, tert.-butylcumyl peroxide of tert.-butyl perbenzoate, in a concentration of 0.01 – 5 per cent, preferably 0.25 – 0.5 per cent, relative to the total weight of the thermosetting mixture, are suitable for this purpose. However, it is also possible to employ other, non-peroxidic, curing accelerators or additives which promote the curing.

It is also possible first to manufacture a prepolymer from the mixtures according to the invention, by heating a homogeneous mixture of the starting materials, finely ground if appropriate, to 50° – 140° C for a time, so that a partially soluble product which can still be deformed by heat, is formed. This pre-polymer must, if appropriate, be ground once more into a powder which can be processed. The prepolymerisation can also be carried out by heating a solution or suspension of the starting materials. Substances which can be used for this purpose are those which do not react with the starting materials and which dissolve them adequately, if desired. Examples of such liquids are: dimethylformamide, tetramethylurea, dimethylsulphoxide, N-methylpyrrolidone, dichloroethylene, tetrachloroethylene, tetrachloroethane, tetrabromoethane, chlorobenzene, dichlorobenzene, bromobenzene, cyclohexanone, dioxane or alkylated aromatic hydrocarbons.

It is furthermore possible, first to manufacture a pre-polymer from the imide and the amine or the imide and the β-aminocrotonic acid derivative by heating the homogeneous mixture of starting materials to 50° – 140° C for a time, so that a still fusible and adequately soluble product is formed which can later be converted, together with the third reactant which is still not present, into a homogeneous reaction mixture or homogeneous reaction solution and can be cured.

The thermosetting mixtures according to the invention are used above all in the sectors of surface protection, electrical engineering, laminating processes and building. They can be used in a formulation which is suited in each particular case to the special end use, in an unfilled or filled state, if appropriate in the form of solutions or dispersions, as lacquers, compression moulding compositions, sintering powders, dipping resins, casting resins, injection moulding formulations, impregnating resins, binders and laminating resins.

A further subject of the invention is therefore process for the manufacture of crosslinked, insoluble and infusible plastics products, characterised in that polyimides of certain unsaturated carboxylic acids of the formula I are reacted together with β-aminocrotonic acid derivatives of the formulae II – VIII and optionally polyamines of the formulae IX and X, at temperatures between 50° and 280° C, preferably 150° to 250° C, if appropriate in the presence of a curing catalyst.

The manufacture, according to the invention, of the crosslinked, infusible products, is carried out, as a rule, while simultaneously shaping the material into mouldings, surface structures, laminates, glued products or foams. In the course thereof it is possible to add, to the thermosetting compositions, the additives which are customary in the technology of thermosetting plastics, such as fillers, plasticisers, pigments, dyestuffs, mould release agents, blowing agents or flame-retarding materials. Glass fibres, mica, quartz powder, kaolin, colloidal silicon dioxide or metal powders, for example, can be used as fillers; calcium stearate, for example, can be used as a mould release agent and azodicarboxylic acid amides, α,α'-azoisobutyric acid nitrile or organic sulphohydrazides, for example, can be used as blowing agents. The blowing agent is employed, depending on its nature, in quantities of 0.5 – 15% by weight, relative to the total quantity of the mixture. Since the curing reaction proceeds very rapidly, it is necessary in certain cases to add kickers (metal salts) to the mixture.

Moulding can be carried out by heating, briefly and rapidly, preferably to 170° – 250° C at a pressure of 1–200 kp/cm$^2$. The mouldings thus formed already have an adequate mechanical strength, so that they can be completely cured, outside the press, in an oven at 200° – 280° C.

If a pre-polymer is first manufactured from the thermosetting mixtures, it can be used, after grinding to a fine powder, as a surface protection agent, by the fluidised bed sintering process.

A solution or suspension of the pre-polymer in a suitable solvent can be used for the manufacture of laminates, by impregnating porous surface structures, such as woven fabrics, fibre mats or fibre fleeces, particularly glass fibre mats or glass fibre fabrics, with solutions or suspensions and removing the solvent by a drying process. Further curing is carried out in a press at, preferably, 170° – 250° C and 5 – 200 kp/cm$^2$ pressure. It is also possible, only to pre-cure the laminates in the press and to post-cure the resulting products in an oven at 200° – 280° C until optimum use properties are achieved.

EXAMPLE 1

309 g (0.815 mol) of N,N'-4,4'-diphenylmethane-bis-maleimide (abbreviated to "bis-imide I" in the following text), 91 g (0.355 mol) of 1,4-butylene glycol bis-(β-aminocrotonic acid ester), 10 g of zinc stearate and 590 g of finely ground glass fibres were thoroughly mixed in a ball mill for 2 hours. Test pieces (of dimensions 120×15×10 mm) were prepared from this thermosetting mixture in order to determine the mechanical properties. The mould temperature was 180° C, the moulding pressure was 500 kp/cm$^2$ and the moulding time was 8 minutes. In order to determine the electrical properties, sheets having the dimensions 140×140×2 mm were moulded, the moulding time here being only 3 minutes. The test pieces were rigid and had a stable shape after this moulding process, and could therefore be released from the mould. They were then additionally post-cured for 4 hours at 180° C and for 2 hours at 200° C. The test data of the mouldings thus obtained are contained in Table 1.

EXAMPLE 2

296 g (0.83 mol) of "bis-imide I", 104 g (0.33 mol) of α,ω-triethylene glycol bis-(β-aminocrotonic acid ester), 10 g of zinc stearate and 590 g of finely ground glass fibres were mixed, moulded, post-cured and tested, as in Example 1. The test data of the mouldings thus obtained are listed in Table 1.

EXAMPLE 3

304 g (0.85 mol) of "bis-imide I", 96 g (0.34 mol) of N,N'-bis-)β-aminocrotonyl)-hexamethylenediamine, 10 g of zinc stearate and 590 g of finely ground glass fibres were mixed, moulded, post-cured and tested, as in Example 1. The test data of the mouldings thus obtained are listed in Table 1.

EXAMPLE 4

299 g (0.84 mol) of "bis-imide I", 101 g (0.34 mol) of N,N'-bis-(β-aminocrotonyl)-p-xylylenediamine, 10 g of zinc stearate and 590 g of finely ground glass fibres were mixed, moulded, post-cured and tested, as in Example 1. The test data of the mouldings thus obtained are contained in Table 1.

EXAMPLE 5

313 g (0.875 mol) of "bis-imide I", 87 g (0.345 mol) of N,N'-bis-(β-aminocrotonyl)-piperazine, 10 g of zinc stearate and 590 g of finely ground glass fibres were mixed, moulded, post-cured and tested, as in Example 1. The test data of the mouldings thus obtained are listed in Table 1.

EXAMPLE 6

292 g (0.83 mol) of "bis-imide I", 104 g (0.33 mol) of N,N'-hexamethylene-bis-(β-aminocrotonic acid methyl ester), 10 g of zinc stearate and 590 g of finely ground glass fibres were mixed, moulded, post-cured and tested, as in Example 1. The test data of the mouldings obtained are given in Table 1.

EXAMPLE 7

278 g (0.775 mol) of "bis-imide I", 122 g (0.31 mol) of N,N'-4,4'-diphenylenemethane-bis-(β-aminocrotonic acid methyl ester), 10 g of zinc stearate and 590 g of finely ground glass fibres were mixed, moulded, post-cured and tested, as in Example 1. The test values of the mouldings thus obtained are contained in Table 1.

EXAMPLE 8

269 g (0.75 mol) of "bis-imide I", 77 g (0.30 mol) of 1,4-butylene glycol bis-aminocrotonic acid ester, 59 g (0.30 mol) of 4,4'-diaminodiphenylmethane, 10 g of zinc stearate and 590 g of ground glass fibres were thoroughly mixed in a ball mill for 2 hours and moulded as in Example 1. The mouldings were then post-cured for 4 hours at 180° C and for 4 hours at 200° C and were tested. The test data of the mouldings thus obtained are listed in Table 1.

EXAMPLE 9

253 g (0.71 mol) of "bis-imide I", 89 g (0.285 mol) of N,N'-hexamethylene-bis(β-aminocrotonic acid methyl ester), 56 g (0.282 mol) of 4,4'-diaminodiphenylmethane, 10 g of zinc stearate and 590 g of quartz powder were mixed, moulded, post-cured and tested as in Example 8. The test data are listed in Table 1.

EXAMPLE 10

263 g (0.735 mol) of "bis-imide I", 82.5 g (0.292 mol) of N,N'-bis-(β-aminocrotonyl)-hexamethylenediamine, 58 g (0.293 mol) of 4,4'-diaminodiphenylmethane, 10 g of zinc stearate and 590 g of kaolin ("Bolus alba") were mixed, moulded, post-cured and tested as in Example 8. The test data are listed in Table 1.

EXAMPLE 11

215 g (0.60 mol) of "bis-imide I", 115 g (0.242 mol) of N,N'-bis-(β-butylaminocrotonyl)-4,4'-diaminodiphenylmethane, 47.5 g (0.24 mol) of 4,4'-diaminodiphenylmethane, 9.4 g of zinc stearate, 277 g of ground glass fibres and 277 g of quartz powder were mixed, moulded, post-cured and tested, as in Example 8. The test data are listed in Table 1.

EXAMPLE 12

242 g (0.675 mol) of "bis-imide I", 99 g (0.269 mol) of 1,4-butylene glycol bis-(β-butylamino-crotonic acid ester), 53.5 g (0.27 mol) of 4,4'-diaminodiphenylmethane, 9.8 g of zinc stearate, 291 g of ground glass fibres and 291 g of kaolin ("bolus alba") were mixed, moulded, post-cured and tested, as in Example 8. The test data are listed in Table 1.

EXAMPLE 13

242 g (0.675 mol) of "bis-imide I", 109 g (0.27 mol) of N,N'-bis-(β-aminocrotonyl)-4,4'-diamino-3,3'-dimethyl-dicyclohexylmethane, 53.5 g (0.27 mol) of 4,4'-diaminodiphenylmethane, 10.1 g of zinc stearate and 597 g of ground glass fibres were mixed, moulded, post-cured and tested, as in Example 8. The test data are listed in Table 1.

EXAMPLE 14

269 g (0.75 mol) of "bis-imide T", 75.5 g (0.3 mol) of N,N'-bis-(β-aminocrotonyl)-piperazine, 59.5 g (0.3 mol) of 4,4'-diaminodiphenylmethane, 10 g of zinc stearate and 590 g of ground glass fibres were mixed, moulded, post-cured and tested, as in Example 8. The test data are listed in Table 1.

Table I

| Properties | 1 | 2 | 3 | 4 | 5 | 6 | 7 | 8 | 9 | 10 | 11 | 12 | 13 | 14 | 18 | 19 |
|---|---|---|---|---|---|---|---|---|---|---|---|---|---|---|---|---|
| Flexural strength according to VSM*) 77,103 (kg/mm²) | 6.90 | 6.45 | 6.06 | 5.44 | 4.45 | 6.33 | 4.8 | 4.2 | 4.5 | 7.2 | 2.8 | 4.0 | 7.7 | 6.1 | 7.4 | 5.3 |
| Impact strength according to VSM 77,105 (cmkg/cm²) | 3.0 | 3.5 | 4.66 | 3.52 | 2.4 | 4.67 | 3.2 | 3.4 | 4.9 | 4.8 | 2.4 | 4.0 | 5.4 | 3.1 | 4.49 | 4.08 |
| Heat distortion point according to Martens (° C) DIN**) 53,458 | 206 | 221 | 178 | 194 | 208 | 173 | 206 | 177 | 166 | 193 | 144 | 143 | 215 | 174 | 210 | 213 |
| Water absorption after storing for 1 day in water at 23° C (%) | 0.19 | 0.19 | 0.36 | 0.55 | 0.32 | | 0.20 | | | | | | | | | |
| Water absorption after storing for 30 minutes in boiling water (%) | 0.28 | 0.51 | 0.41 | 0.62 | 0.44 | | 0.26 | 0.41 | 1.58 | 1.16 | 1.07 | 1.19 | 0.47 | 0.40 | | |
| Dielectroloss factor tgδ × 10³ at 50 Hz | 0.50 | | 0.49 | 0.40 | 0.40 | | 0.50 | 5.3 | 4.3 | 5.4 | 4.6 | 5.1 | 5.1 | 5.2 | | |
| Dielectric constant $\epsilon_R$ at 50 Hz | 5.2 | | 4.9 | 5.1 | 5.2 | | 5.0 | | | | | | | | | |
| Specific volume resistivity (Ω × cm) | $1.3 \times 10^{16}$ | | $8.4 \times 10^{14}$ | $8.1 \times 10^{15}$ | $1.3 \times 10^{16}$ | | $1.7 \times 10^{16}$ | | | | | | | | | |
| Surface resistance (Ω) | $3.5 \times 10^{14}$ | | $6.0 \times 10^{14}$ | $9.1 \times 10^{14}$ | $1.5 \times 10^{14}$ | | $3.7 \times 10^{14}$ | | | | | | | | | |

*)VSM = Verein Schweizerischer Maschinenindustrieller (Association of Swiss Engineering Equipment Manufacturers)
**)DIN = Deutsche Industrie-Norm (German Industrial Standards)

EXAMPLE 15

7.75 g of "bis-imide I", 2.25 g of 1,4-butylene glycol bis-(β-aminocrotonic acid ester), 1.5 g of azo-isobutyric acid nitrile and 0.2 g of a foam stabiliser based on silicones, obtainable commercially under the designation "Rhodorsil Si 3193" (Rhône Poulenc), were thoroughly mixed and introduced into a mould having the dimensions 64 × 35 × 14 mm. After closing, the mould was heated for 1 hour at 180° C. This gave a fine-pored foam moulding which had a glass transition temperature of 202° C.

EXAMPLE 16

35.8 g of "bis-imide I", 11.3 g of N,N'-bis-(β-aminocrotonyl)-hexamethylenediamine, 2.0 g of azo-isobutyric acid nitrile and 0.2 g of a foam stabiliser based on silicones, obtainable commercially under the designation "Rhodorsil Si 3193" (Rhône Poulenc), were mixed well. 13 g of this mixture were converted, as in Example 15, into a fine-poured foam moulding which had a closed surface.

EXAMPLE 17

35.8 g of "bis-imide I", 10.3 g of 1,4-butylene glycol bis-(β-aminocrotonic acid ester), 1.5 g of azo-isobutyric acid nitrile, 2.0 g of azo-dicarbonamide and 0.2 g of a foam stabiliser based on silicones, obtainable commercially under the designation "Rhodorsil Si 3193" (Rhône Poulenc), were mixed well. 14 g of this mixture were converted, as in Example 15, into a fine-poured foam moulding. The resulting foam moulding had a glass transition temperature of 227° C.

EXAMPLE 18

278 g (0.777 mol) of "bis-imide I", 84.2 g (0.231 mol) of N,N'-bis-(β-aminocrotonyl)-4,4'-diaminodiphenylmethane, 37.4 g of a liquid mixture consisting of 4,4'-methylenedianiline, 3-ethyl-4,4'-methylenedianiline and 3,3'-diethyl-4,4'-methylenedianiline, 10 g of zinc stearate and 590 g of ground glass fibres were mixed and moulded as in Example 1, and cured for 4 hours at 100° C and for 4 hours at 200° C. The test data of the mouldings obtained in this way are listed in Table 1.

EXAMPLE 19

322 g (0.9 mol) of "bis-imide I", 113 g (0.36 mol) of α,ω-triethylene glycol bis-(β-aminocrotonic acid ester) and 65 g of a polyamine with an amine equivalent weight of 119, prepared from aniline and formaldehyde, were mixed well. 400 g of this mixture were mixed with 10 g of zinc stearate and 590 g of ground glass fibres, moulded and cured, as in Example 18. The test data of the resulting mouldings are listed in Table 1.

EXAMPLE 20

17.9 g (0.05 mol) of "bis-imide I" and 7.9 g of 1,12-dodecanediol-bis-(β-methylaminocrotonic acid ester) were mixed thoroughly. 3.0 g of this mixture were poured into a cylindrical metal mould with a diameter of 5.0 cm, which had been heated to 210° C. A pressure of 300 kg/cm² was applied to the mixture in this mould for 15 minutes, as a result of which it was converted into a rigid, transparent moulding. This moulding was then warmed to 180° C for an additional 4 hours. The dielectric loss factor tgδ and the relative dielectric constant $\epsilon_{rel.}$ of this test piece were measured. The results of the measurements are contained in Table 2.

EXAMPLE 21

25.0 g (0.07 mol) of "bis-imide I" and 13.4 g (0.028 mol) of N,N'-bis-(β-n-nonylaminocrotonyl)-dodecamethylenediamine were mixed thoroughly. 3.0 g of this mixture were converted, in the same manner as in Example 20, into a cured moulding, the dielectric test data of which are listed in Table 2.

EXAMPLE 22

17.9 g (0.05 mol) of "bis-imide I", 9.1 g (0.0147 mol) of N,N' -bis-(β-methylamino-crotonyl)-dodecamethylenediamine, 0.1 g of zinc stearate and 27 g of ground glass fibres were mixed thoroughly. 4.0 g of this mixture were converted, in the same manner as in Example 20, into a cured moulding, the dielectric test data of which are listed in Table 2.

Table 2

|  | Example | | |
|---|---|---|---|
|  | 20 | 21 | 22 |
| Dielectric loss factor tgε×10² (50 Hz; 23° C according to DIn *) 53,483) | 0.42 | 0.60 | 0.50 |
| Dielectric constant εrel (50 Hz; 23° C according to DIN 53,483) | 3.6 | 3.5 | 4.4 |

*) DIN = Deutsche Industrie-Norm (German Industrial standards)

EXAMPLE 23

16.1 g (0.045 mol) of "bis-imide I", 2.97 g of 4,4'-diaminodiphenylmethane (0.015 mol) and 4.26 g (0.03 mol) of β-aminocrotonic acid allyl ester were mixed well. The initially doughy mixture was converted in the course of 1–2 hours into a solid, thermoplastic product, which was pulverised. 4.0 g of this powder were cured for 30 minutes in the mould mentioned in Example 20 at 175° C and under a pressure of 300 kg/cm². A clearly transparent moulding which is rigid at this temperature is formed in this way.

EXAMPLE 24

1.35 g (0.0038 mol) of "bis-imide I", 9.45 g (0.024 mol) of N,N'-4,4'-3-ethyl-diphenylmethane-bis-maleimide, 8.50 g (0.021 mol) of N,N'-4,4'-3,3'-diethyldiphenylmethane-bis-maleimide and 8.7 g of N,N'-1,6-hexamethylene-bis-(β-aminocrotonic acid anilide) were mixed thoroughly. 3.0 g of this mixture were converted, as in Example 20, into a moulding which was rigid at this temperature.

We claim:

1. A storage-stable, heat-curable thermosetting composition of matter, which consists essentially of
   (a) a polyimide of a saturated dicarboxylic acid of formula I

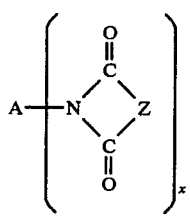

(I)

wherein A denotes a x-valent organic radical of at least 2 and at most 30 carbon atoms, Z denotes a radical of the formula

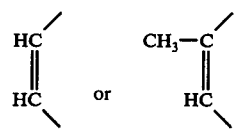

and x denotes the number 2 or 3, or a mixture of said polyimides, and (b) a β-aminocrotonic acid derivative or mixture of said derivatives selected from the group consisting of those of the formulae II to VIII $$(CH_3-\underset{|}{\overset{NHR}{C}}=CH-COO)_n-R_1 \quad (II)$$

$$(CH_3-\underset{|}{\overset{NHR}{C}}=CH-CO-NR)_n-R_1 \quad (III)$$

$$(CH_3-\underset{|}{\overset{NHR}{C}}=CH-CO-N\underset{2}{\overset{}{<}}T \quad (IV)$$

$$(RO-CO-CH=\underset{|}{\overset{CH_3}{C}}-NH)_n-R_1 \quad (V)$$

$$(R-\underset{|}{\overset{R_2}{N}}-CO-CH=\underset{|}{\overset{CH_3}{C}}-NR)_n-R_1 \quad (VI)$$

$$CH_3-\underset{|}{\overset{NHR}{C}}=CH-CO-X-E \quad (VII)$$

$$CH_3-\underset{|}{\overset{NHR}{C}}=CH-COO-R_1-\underset{|}{\overset{R}{N}}-\overset{O}{\overset{\|}{C}}-CH=\underset{|}{\overset{NHR}{C}}-CH_3 \quad (VIII)$$

wherein each of R and R₂ denotes a hydrogen atom, a linear, branched or cyclic hydrocarbon radical having up to 9 carbon atoms, R₁ denotes a n-valent linear, branched or cyclic hydrocarbon radical having up to 20 carbon atoms or a heterocyclic radical selected from the group consisting of

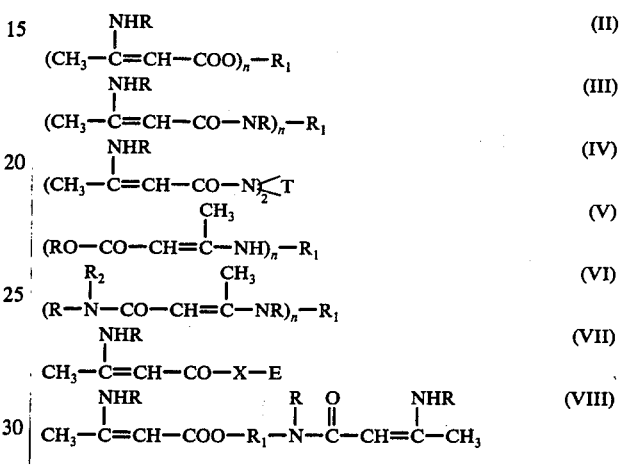

T together with both nitrogen atoms denotes

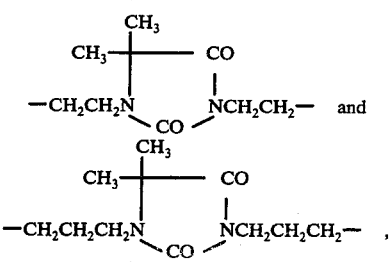

X denotes an oxygen atom or the —NH— group, E denotes the allyl or furfuryl radical which is suitable to undergo polymerization reactions, n is a number from 2 to 4, and wherein said composition contains 0.25 to 1.0 equivalent of β-aminocrotonyl groups (b) per each 1.0 equivalent of imide groups.

2. A composition according to claim 1, which consists essentially of (a) a polyimide of formula I, in which A denotes a radical selected from the group consisting of

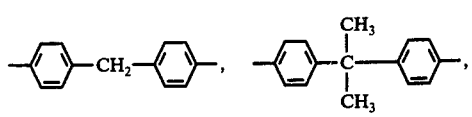

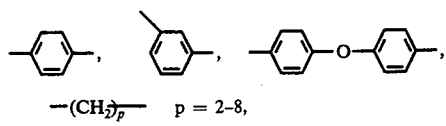

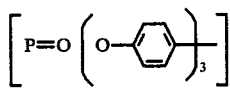 p = 2-8,

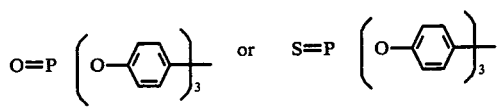

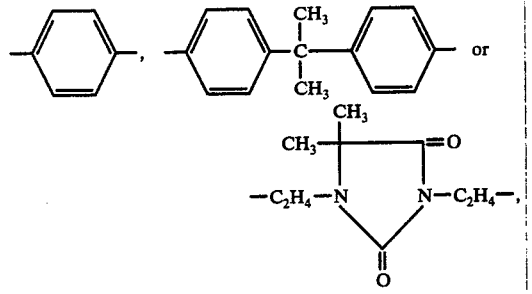

and Z denotes the vinylene radical, and
(b) a β-aminocrotonic acid ester of the formula II, wherein n is 2, R denotes a hydrogen atom and $R_1$ denotes an alkylene or oxaalkylene radical of 2 to 10 carbon atoms or denotes a radial selected from the group consisting of

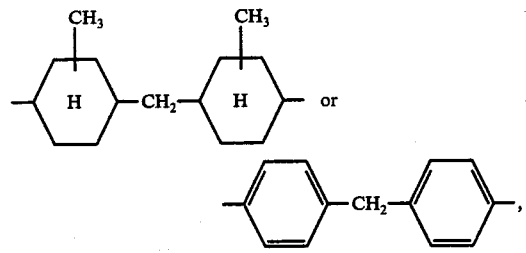

a β-aminocrotonic acid amide of formula III, wherein n is 2, R denotes a hydrogen atom and $R_1$ denotes an alkylene or oxaalkylene radical of 2 to 10 carbon atoms or denotes a radical of the formulae

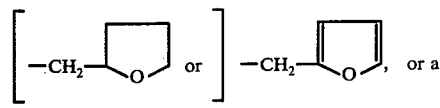

a β-aminocrotonic acid amide of formula IV, wherein R denotes a hydrogen atom and the group

denotes the radical of the formula

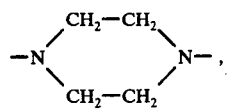

a β-aminocrotonic acid ester of formula V, wherein n is 2 and R denotes methyl or phenyl and $R_1$ has the same meaning as in the β-aminocrotonic acid amides of the formula III, a β-aminocrotonic acid amide of formula VI, wherein n is 2, R denotes a hydrogen atom, phenyl or a lower alkyl group with 1 to 4 carbon atoms and $R_1$ has the same meaning as in the β-aminocrotonic acid amides of the formula III, a β-aminocrotonic acid ester of formula VII, wherein R denotes a hydrogen atom and E denotes the allyl radical or a radical of the formula $$\left[-CH_2-\underset{O}{\bigcirc}\right] \text{ or } -CH_2-\underset{O}{\bigcirc}, \text{ or a}$$

β-aminocrotonic acid ester amide of formula VIII, wherein R denotes a hydrogen atom and $R_1$ denotes a phenylene radical or an alkylene radical of 2 to 10 carbon atoms.

3. A composition according to claim 1, which consists essentially of
a. a polyimide of formula I and,
b. a β-aminocrotonic acid derivative selected from the group consisting of those of the formulae II to V.

4. A composition according to claim 1 wherein said composition contains less than 1.0 equivalent of β-aminocrotonyl groups (b) per 1 equivalent of imide groups (a).

5. A composition according to claim 1, wherein the polyimide of formula I is N,N'-4,4'-diphenylmethane-bis-maleic imide.

6. A composition according to claim 1, wherein the β-aminocrotonic acid derivative of formula II is 1,4-butylene glycol-bis-(β-aminocrotonic acid ester), α,ω-triethylene glycol-bis-(β-aminocrotonic acid ester) or 1,4-butylene glycol-bis-(β-butylamino-crotonic acid ester).

7. A composition according to claim 1, wherein the β-aminocrotonic acid derivative of the formula III is N,N'-bis-(β-aminocrotonyl)-hexamethylenediamine, N,N'-bis-(β-aminocrotonyl)-p-xylylenediamine, N,N'-bis-(β-aminocrotonyl)-4,4'-diaminodiphenylmethane, N,N'-bis-(β-butylaminocrotonyl)-4,4'-diaminodiphenylmethane or N,N'-bis-(β-aminocrotonyl)-4,4'-diamino-3,3'-dimethyldicyclohexylmethane.

8. A composition according to claim 1, wherein the β-aminocrotonic acid derivative of the formula IV is N,N'-bis-(β-aminocrotonyl)-piperazine.

9. A composition according to claim 1, wherein the β-aminocrotonic acid derivative of the formula V is N,N'-hexamethylene-bis-(β-aminocrotonic acid methyl ester) or N,N'-4,4'-diphenylmethane-bis-(β-aminocrotonic acid methyl ester).

10. A composition according to claim 1, wherein the β-aminocrotonic acid derivative of the formula VI is N,N-1,6-hexamethylene-bis-(β-aminocrotonic anilide).

* * * * *